United States Patent [19]

Hawk

[11] Patent Number: 4,904,011
[45] Date of Patent: Feb. 27, 1990

[54] SHOVEL AND METHOD OF MAKING THE SAME

[76] Inventor: Ernest D. Hawk, 7463 Canyon Dr., Yucca Valley, Calif. 92284

[21] Appl. No.: 201,604

[22] Filed: Jun. 2, 1988

[51] Int. Cl.$^4$ ............................. A01B 1/22; B25G 3/02
[52] U.S. Cl. ......................................... 294/49; 294/57; 294/60
[58] Field of Search ................. 294/49, 51, 53.5, 54.5, 294/55, 57, 60; 76/113; 172/371–377, 381

[56] References Cited

U.S. PATENT DOCUMENTS

| | | | |
|---|---|---|---|
| D. 198,979 | 8/1964 | Petoe | D39/1 |
| 212,953 | 3/1879 | Kreider | 294/49 |
| 272,266 | 2/1983 | Kirkpatrick et al. | 294/49 |
| 333,173 | 12/1885 | Taylor | 294/55 X |
| 528,607 | 11/1894 | Peat | 294/55 |
| 821,847 | 5/1906 | Arnavat | 294/49 X |
| 1,334,586 | 3/1920 | Baker | 172/376 X |
| 1,549,542 | 8/1925 | Hejma | 294/49 |
| 1,870,891 | 8/1932 | Bristow et al. | 172/376 X |
| 1,888,170 | 11/1932 | Hornbaker | 294/49 |
| 1,931,349 | 10/1933 | Habig | 294/60 X |
| 2,486,434 | 11/1949 | Plummer | 294/51 |
| 2,787,491 | 4/1957 | Roberts | 294/51 |
| 3,064,500 | 11/1962 | Duppengiesser | 76/113 |
| 3,226,149 | 12/1965 | McJohnson | 294/50 |
| 3,782,770 | 1/1974 | Lee | 294/49 |

FOREIGN PATENT DOCUMENTS

| | | | |
|---|---|---|---|
| 125245 | 4/1919 | United Kingdom | 172/371 |
| 810800 | 3/1959 | United Kingdom | 294/49 |

*Primary Examiner*—Johnny D. Cherry
*Attorney, Agent, or Firm*—Richard L. Gausewitz

[57] ABSTRACT

A shovel formed of a blade member, two side members, a handle retaining member, and a handle. In one embodiment, each of the blade member, two side members and handle retaining member is formed as a metal blank, which is stamped, punched and bent to the desired configuration, with the metal blanks of the sides and handle retaining member having formed therein interlocking coacting detenting elements for enabling adjustment of the angle of the handle relative to the blade portion. Welds and a rivet complete the assembly of the shovel. In an alternate embodiment, a single metal blank is used to form the blade and the two side members as a unit, thus avoiding welding or other fastening of the sides to the blade. A foot pressure rest is provided with the blade, with the side members generally parallel and spaced the width of the blade. The handle is attached at an angle which enables effective application of force during use.

6 Claims, 3 Drawing Sheets

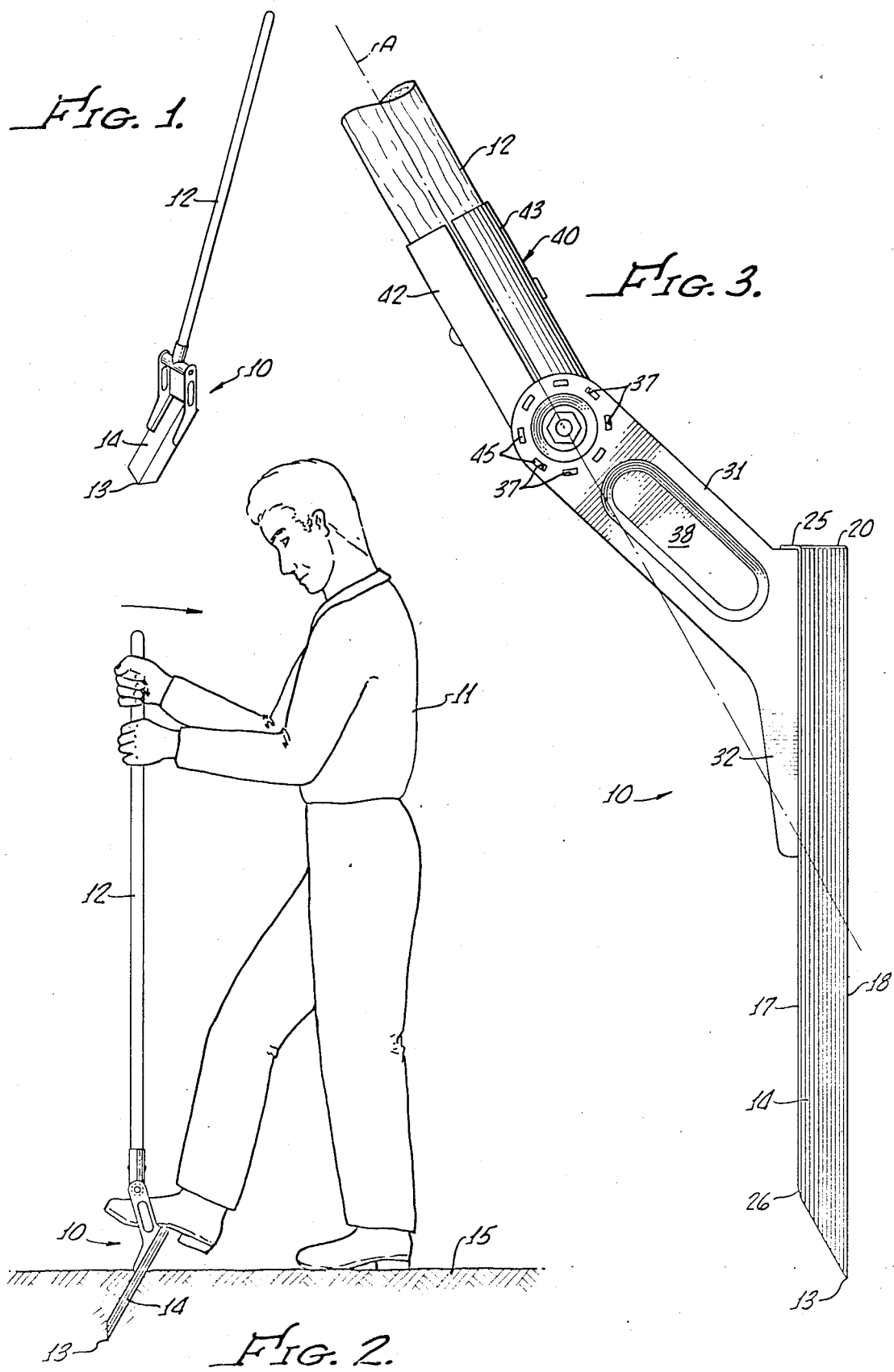

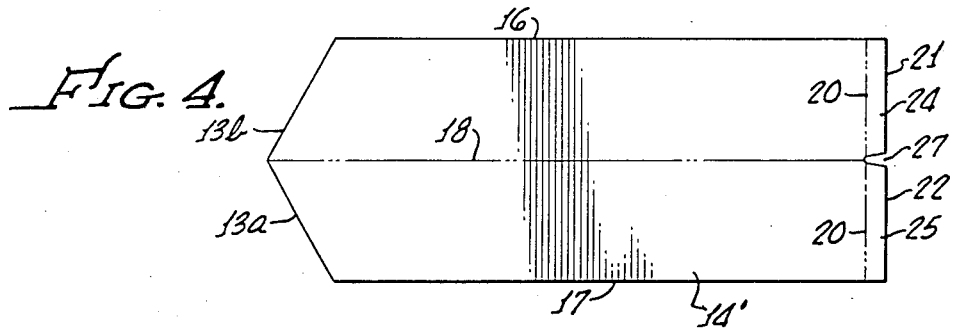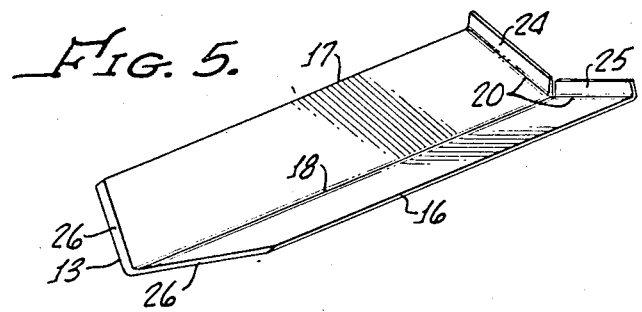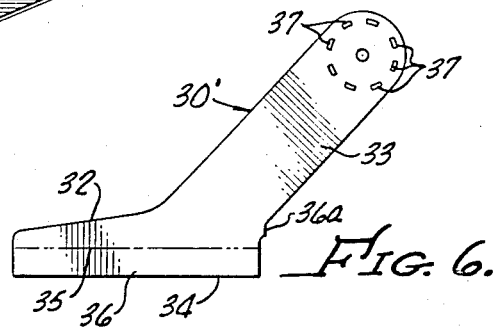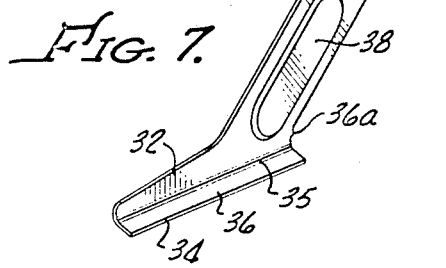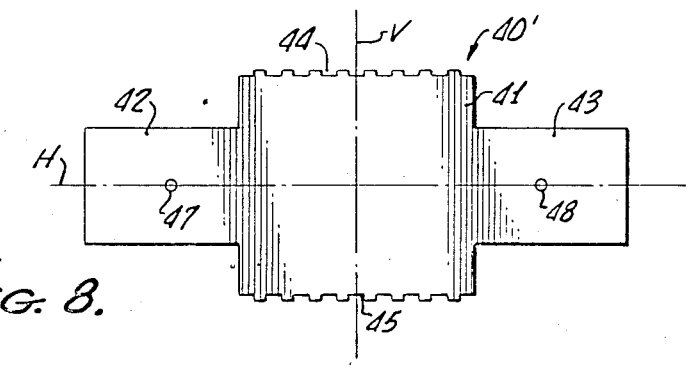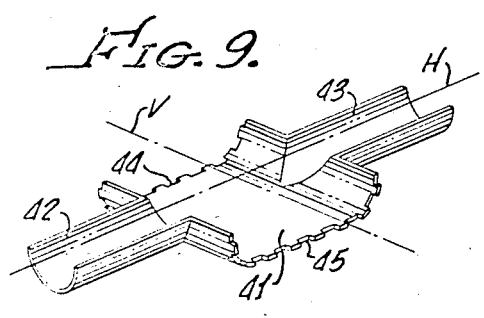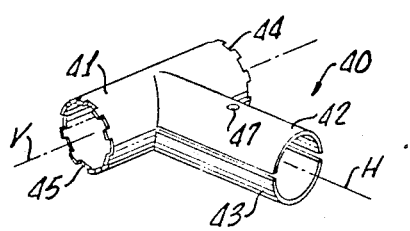

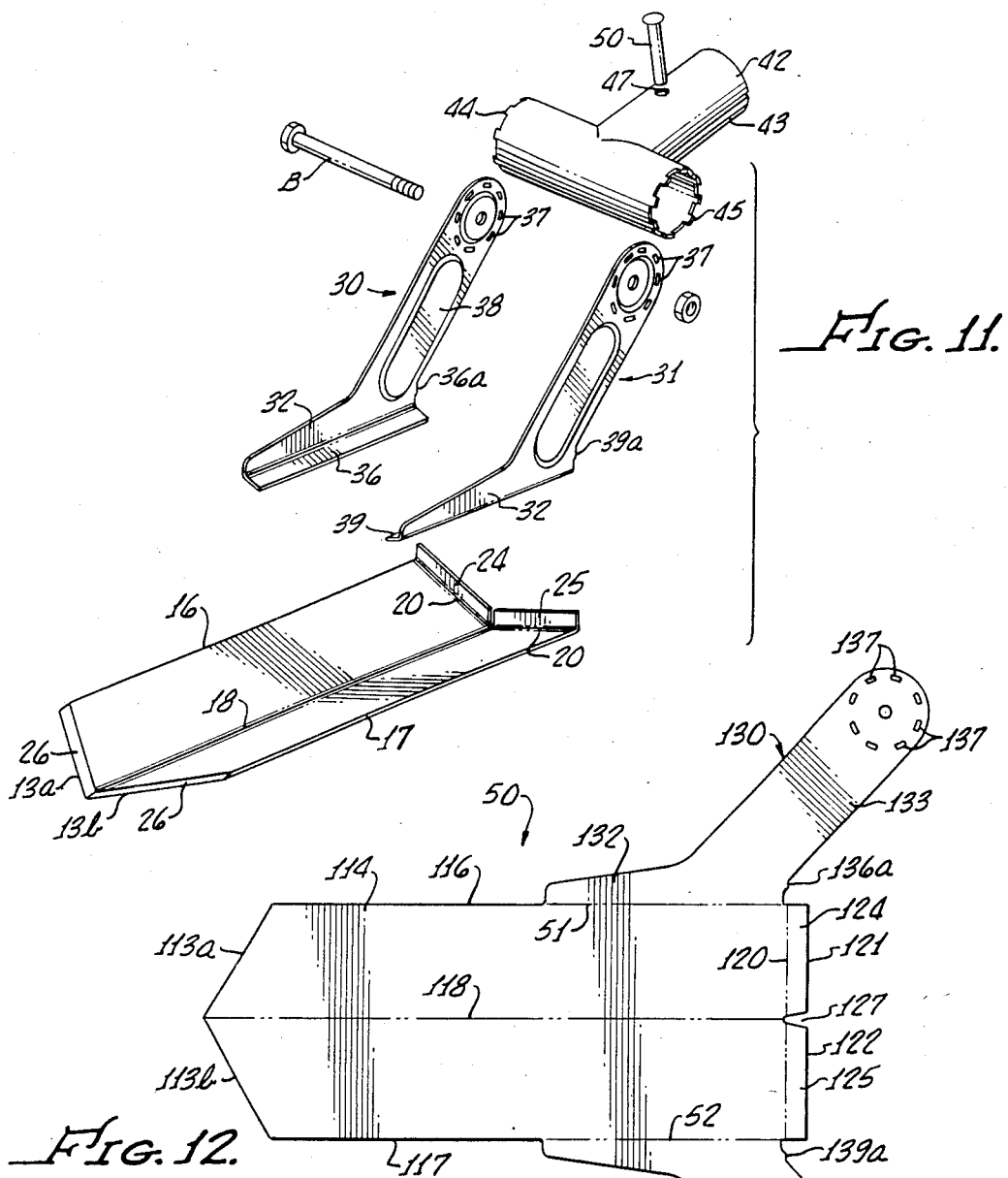
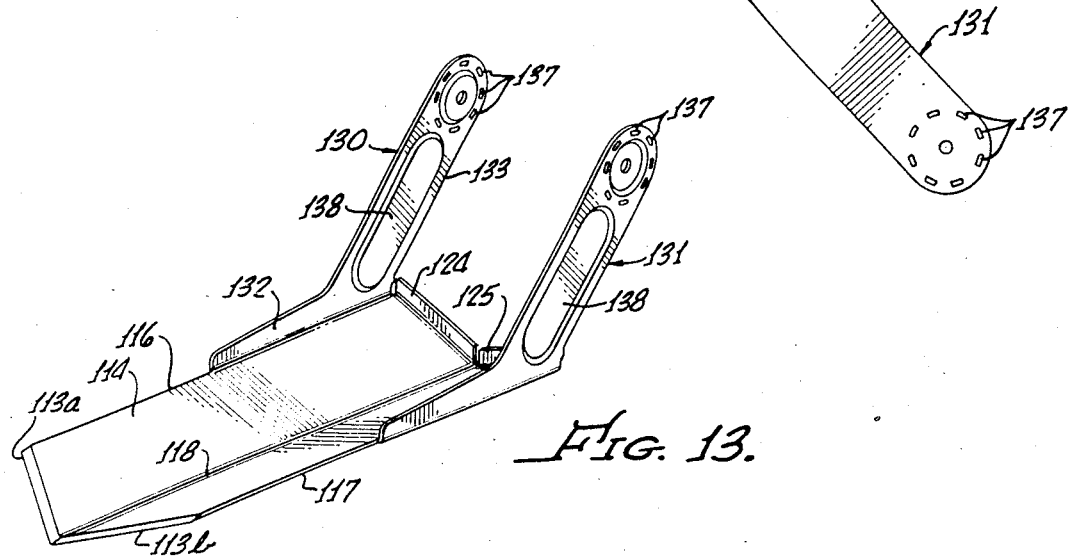

4,904,011

SHOVEL AND METHOD OF MAKING THE SAME

BACKGROUND OF THE INVENTION

The background of the invention will be discussed in two parts:

Field of the Invention

This invention relates to earth digging tools, such as shovels, and more particularly to a trenching shovel and method for making the same.

Description of the Prior Art

Shovels have been used for gardening and the like for centuries. Shovels take various forms, depending on usage. Trenching shovels are designed for penetrating and removing earth to form a trench, usually for such purposes as installation of an irrigation or sprinkling system. In the formation of such trenches, it is preferable that the trench be of generally shallow width, with the sides of the trench generally parallel to one another, with the bottom of the trench of a generally uniform depth or grade. Typically the blade member of a trenching shovel has generally parallel sides with an arcuate or pointed soil entrance end. In cross-section, the blade may be straight, curved or bent with upwardly extending portions to form a soil retention support for soil removal.

In some such trenching shovel designs, generally planar side cutting elements have been added to the blade to facilitate blade entry into the soil. In other such devices, some means of providing support for the foot have been added for enabling application of pressure directly to the blade by the foot of the operator.

Such prior art shovels have tended to be unduly complicated and expensive to construct, by requiring such forming operations as metal casting and grinding and excessive welding or utilize fabrication techniques which are not economical or do not lend themselves to mass production.

Furthermore, limited utility is inherent in the design of such prior art shovels. In trenching with a shovel, although the majority of soil is removed from the trench with each shovelful, a certain amount of loosened soil remains at the bottom of the trench. With trenching shovels of conventional design, removal of the loosened soil requires excessive bending and stooping due to the angular orientation between the blade and the handle.

In accordance with an aspect of the invention, it is an object of the present invention to provide a new and improved trenching shovel and method for making the same.

SUMMARY OF THE INVENTION

The foregoing and other objects of the invention are accomplished by providing a shovel formed of a blade member, two side members, a handle retaining member, and a handle. In one embodiment, each of the blade member, two side members and handle retaining member is formed as a metal blank, which is stamped, punched and bent to the desired configuration, with the metal blanks of the sides and handle retaining member having formed therein interlocking coacting detenting elements for enabling the fixing of a given angle of the handle relative to the blade member. Simple welds and a rivet complete the assembly of the shovel. The blank for the blade is formed to provide a foot pressure rest at the heel of the blade, with the soil penetrating end of the blade being V-shaped in plan view as well as end view. The handle retaining portion is configured from a blank which is curved into intersecting tubular portions forming a T-shaped member, the center leg of which retains the handle, with the cross-leg thereof having opposing edges configured with a plurality of spaced tangs, the tangs protruding in alignment with the metal in an axial direction. The side members are formed from like blanks, in mirror image, each having first and second generally bar-shaped connecting arms. The first connecting arm has a bent tab end for connection, such as by welding to a lateral edge of the blade adjacent the heel. The second connecting arm extends at an obtuse angle to the first and is provided adjacent the free end thereof with a plurality of circumferentially oriented asymmetrically disposed arcuate slots, equal in number, and configured, dimensioned and arranged for receiving the tangs in an interconnecting edge of the cross-leg of the handle retaining member. On attachment of the side members to the blade, the second connection arms are disposed in generally parallel relation, with the dimension of the cross-leg of the handle retaining member being sufficient for being received therebetween. Upon engagement of the tangs within the arcuate slots, the tang ends are spot welded to the side members for connecting the handle retaining member at a preferred orientation of the handle relative to the blade. The angular orientation of the second connecting arm portions provides an offset of the handle relative to the blade in a direction away from the user enabling ready access to the foot pressure rest, while the angular orientation of the handle relative to the blade enables optimum use of the handle for leverage and lifting. In an alternate embodiment, a single metal blank is used to form the blade and the two side members as a unit, thus avoiding welding or other fastening of the sides to the blade.

Other objects, features and advantages of the invention will become apparent from a reading of the specification, when taken in conjunction with the drawings, in which like reference numerals refer to like elements in the several views.

BRIEF DESCRIPTION OF THE DRAWINGS

FIG. 1 is a perspective view of the trenching shovel according to the invention;

FIG. 2 is a side view of an operator utilizing the trenching shovel of FIG. 1;

FIG. 3 is an enlarged side elevational view of the blade assembly of the shovel of FIG. 1;

FIG. 4 is a plan view of a metal blank used to form the blade of the shovel of FIG. 1;

FIG. 5 is an enlarged perspective view of the blade formed from the blank of FIG. 4;

FIG. 6 is a plan view of a metal blank used to form one of the side members of the blade assembly of FIG. 1;

FIG. 7 is an enlarged perspective view of the side member formed from the blank of FIG. 6;

FIG. 8 is a plan view of a metal blank used to form the handle retaining member of the blade assembly of the shovel of FIG. 1;

FIG. 9 is a side elevational view of the blank of FIG. 8 after a first stamping operation;

FIG. 10 is an enlarged perspective view of the handle retaining member formed from the blank of FIG. 8;

FIG. 11 is an exploded perspective view of the parts of the blade assembly shown in FIGS. 5, 7, and 10;

FIG. 12 is an alternate embodiment of a metal blank used to form the blade and sides in one operation; and FIG. 13 is an enlarged perspective view of the blade formed from the blank of FIG. 12.

DESCRIPTION OF THE PREFERRED EMBODIMENT

Referring now to the drawings, and particularly to FIG. 1, there is shown a trenching shovel including a blade assembly, generally designated 10, connected to a handle 12. FIG. 2 depicts the shovel in use by an operator 11. The operator 11 grips the handle 12 and places the toe or soil penetrating end 13 of the blade 14 of the blade assembly 10 into contact with the soil 15, and uses his foot to press upon the heel of the blade 14. In this depiction, the handle 12 is at an angle to the direction of thrust on the blade 14 of the blade assembly 10, that is, forwardly of the operator 11, and thus in a position of non-interference with the leg of the operator 11, allowing maximum pressure to be placed on the blade 14 by the foot of the operator or user 11.

As the blade 14 of the blade assembly 10 enters the soil 15, the operator 11 then pulls and pushes slightly on the handle 12, while applying pressure with the foot, to facilitate loosening of the soil 15 as the blade 14 enters. The angle of the handle 12 relative to the general direction of the plane of penetration of the blade of the blade assembly 10 provides excellent leverage to facilitate soil penetration and removal. As will become apparent, with the angle between the handle 12 and this plane of entry, removal of loose soil at the bottom of the trench may be facilitated without undue bending and stooping on the part of the operator or user 11.

In one embodiment, the blade assembly 10 is economically formed by punching, bending and stamping from four metal blanks. These blanks, which will be described hereinafter, are used to form the blade 14, the side members 30 and 31, and the handle retaining member, generally designated 40, these being the parts of the blade assembly 10.

Referring now to FIGS. 3 through 5, the blade 14 is formed from a generally planar sheet metal blank, designated 14' in FIG. 4, with the blank 14' being somewhat of a chevron-shaped blank of sheet metal of sufficient thickness for the particular use as a soil penetrating tool. The blank 14' has first and second opposite, generally parallel edges or sides 16 and 17. A dotted bend line 18 extends down the center of the blank 14' intermediate the sides 16 and 17. At the left, as viewed in FIG. 4, the soil penetrating end 13 is formed of outwardly directed angularly convergent edges 13a and 13b, which intersect to form a point at the junction with the bend line 18. At the other end of the blank 14', there is another lateral bend line, designated 20, which bend line is generally perpendicular to the longitudinal bend line 18. The adjacent edge of the blank 14' lies along a line generally parallel to the bend line 20, and is formed as two collinear edges 21 and 22, which form two foot support tab portions 24 and 25, separated by a symmetrical V-shaped notch 27, of a particular angle, the purpose of which will become obvious. To facilitate soil penetration, by reference to FIG. 3, the underside of the end 13 of the blade 14 is honed or sharpened to provide a cutting edge 26.

As shown in FIGS. 5 and 11, the blank 14' is bent to form a shovel blade 14, which in front elevation is a shallow V-shaped trough. The two tab portions 24 and 25 are bent inwardly toward the so-formed trough with the angle of the notch 27 being such that the adjacent edges of the tab portions 24 and 25 which form the two sides of the notch 27 come into generally abutting relation to form a foot pressure rest or support for the foot of the operator 11. Each tab portion 24, 25 is generally at a right angle to the plane of its corresponding half of the main body portion of the blade 14.

Referring now to FIGS. 3, 6, 7 and 11, the two side members are formed from generally planar sheet metal blanks, and due to the symmetry, only one form of blank need be cut or stamped to form both side members 30 and 31. However, two such blanks are required for one shovel and forming requires that the two side members 30 and 31 be formed as mirror images of one another. FIG. 6 depicts a blank, designated 30', which may be used as a starting point for either side 30, 31, with blank 30' being die-stamped or cut from a generally planar sheet metal stock. The blank 30' is somewhat L-shaped with an obtuse angle of about 135 degrees between the connection arms 32, 33, that is, the longitudinal axis of the connection arm 33 is at about a forty-five degree angle relative to the plane of the lower edge of the lower arm 32. The lower arm 32 has a straight lower edge 34 with a bend line 35 shown in parallel relation therewith, the bending along this line 35 forming a connecting tab portion 36. The distal end of the upwardly angularly oriented other connection arm 33 is rounded, and, about the center of the radius of rounding there are formed, such as by stamping or punching, a plurality of arcuate slots 37 which are formed in a circumferential direction about the center of the radius. These slots 37 are asymmetrically positioned so that connection to the handle retaining portion 40 may be accomplished in only one angular position, as will be described hereinafter. The side of arm 33 has a reinforcing elongate, generally ovate depression 38 (See FIGS. 3, 7 and 11) formed therein, such as by die forming. The other connection arm 32 is suitably reinforced upon bending along bend line 35 to form the tab portion 36, which effectively provides a right angle structural reinforcement.

As best illustrated in FIG. 11, the tab portion 36 of side member 30, and the corresponding tab portion 39 of side member 31, are formed at an angle other than perpendicular to the plane of the balance of arm 32, this angle corresponding to the angle of inclination of the corresponding side of the blade 14, to which the side member will be secured, such as by welding. With the proper angle, the side members 30 and 31, when secured to the blade 14, will be generally parallel to one another. At the lower rear of each of the tab portions 36, 39 of the side members 30, 31, there are formed heel guides 36a, 39a, each of which is a short edge, generally perpendicular to the plane of the tab portion when bent, and of a length generally equal or slightly greater than the bent dimension of the tabs 24, 25 of the blade member 14.

Referring now to FIGS. 8 through 11, the handle retaining member 40 will be described. The handle retaining member 40 is formed from a blank 40', shown in FIG. 8, which is die cut or stamped from a generally planar sheet metal material suitable for bending or cold forming into curved shapes. The directional terms herein employed are with reference to the orientation of the blank 40' in the drawings. The blank 40' includes a generally rectangular central body portion 41, with laterally-extending (as viewed in the drawings) opposed projections 42 and 43, each of which is generally identical in size to the other.

The blank 40' is symmetrical about a vertical axis, designated "V" in the drawings, through the geometric center thereof and symmetrical about a horizontal axis, designated "H" in the drawings, through the geometric center thereof. The projections 42, 43 are shorter in height than the central body portion 41, with this height corresponding generally to the circumference of the handle 12. Similarly, the width of the central body portion 41 is generally equal to the circumference of the circle which is defined by the arcuate slots 37 in the connection arm portions 33 of the side members 30 and 31. The projections 42, 43 are provided with apertures 47, 48 which, as will become apparent, are positioned so that upon forming the handle retaining member 40, a rivet may be passed therethrough for retention of the handle 12.

The upper and lower sides 44, 45 of the central body portion 41 are formed to provide a plurality of tangs, with the outer edges of the tangs of edges 44 and 45 defining straight lines, each of which is parallel to the other. The tangs of edges 44, 45 are equal in number to the number of slots 37 in one connection arm 33, with the spacing or length of the tangs corresponding to the spacing or length of the slots 37 in one direction of orientation of the handle relative to the blade. In other words, with the blank 40' formed into the handle retaining member 40, the slots 37 may be equal in arcuate length with varied spacing therebetween, with the tangs being equal in number and likewise formed for interengagement therewith. Alternatively, for orientation, the slots 37 may be of different arcuate lengths, with the tangs of edges 44, 45 being equal in number and formed for correspondence therewith.

The blank 40' is formed, in successive stages as shown in FIGS. 9 and 10, with the completed handle retaining member shown in FIGS. 10 and 11. In FIG. 9, as a first bending or forming operation, the blank 40' is formed about the horizontal axis "H", to provide first and second semi-tubular portions 42, 43. In the next stage, the thus-formed part is formed or curved about the vertical axis "V" to obtain the handle retaining member 40 shown in FIGS. 10 and 11. As shown, the handle retaining member 40 is formed into intersecting tubular portions forming a T-shaped member, the center leg of which is formed by the central body portion 41 of the blank 40', for receipt of the handle 12 therein, with the cross-leg thereof formed by protections 42, 43 of the blank 40' and having opposing tanged edges 44, 45 configured with identically configured tang arrangements with the tangs protruding in alignment with the metal in an axial direction.

Referring now to FIG. 11, the parts are shown in exploded relation prior to final assembly of the shovel. The sides 30, 31 and handle retaining member 40 have formed therein interlocking coacting detenting elements, that is the tangs of edges 44, 45 and slots 37 of side members 30, 31, which are dimensioned, configured and arranged for enabling positioning of the angle of the handle 12 at a fixed angle relative to the main longitudinal axis of the blade 14, that is, an axis generally parallel to the lower edge defined by bend line 18. This fixed angle is approximately thirty degrees, that is, by reference also to FIG. 3, the angle between the lower edge of the blade 14 and the longitudinal axis (designated "A" in the drawings) of the handle 12 is about thirty degrees.

For assembly, the tab portion 36 of side member 30, and the corresponding tab portion 39 of side member 31, are secured, such as by welding, at opposites sides 16 and 17 of blade member 14 adjacent the rear thereof, that is, the corners of the tab portions 36, 39 are in alignment with the sides 16, 17, with the heel guides 36a, 39a thereof in abutting relation with the corresponding adjacent edges of the tab portions 24, 25 of the blade member 14. The interconnection of the heel guides 36a, 39a to the tab portions 24, 25 is accomplished, such as by welding, to thus provide strength to the foot pressure rest thus-formed at the heel of the blade member 14. The heel guides 36a and 39a, at the lower ends thereof, are provided with a slight undercut to provide clearance for the curvature of the bent tab portions 24, 25. To provide additional strength, the edges of the tab portions 24, 25 at the junction with the center bend line 18 of the blade member 14 may likewise be welded.

Next, the tangs of edges 44, 45 are engaged or detented into the slots 37 of opposite side members 30, 31, and the outer edges of the tangs are spot welded to the material of the sides 30, 31, adjacent the slots 37, or a bolt "B" is passed through aligned centrally disposed openings to secure the parts. The handle 12 is then affixed by placing an end thereof into the tubular opening provided by the coacting semi-tubular portions 42 and 43. The handle 12 at that end is preferably provided with a through hole (not shown) for alignment with the aligned apertures 47, 48, of parts 42, 43, and a suitable fastening device, such as a rivet 50 is passed through the thus aligned openings to secure the handle 12 within the handle retaining member 40.

The thus assembled shovel is shown in perspective in FIG. 1 and in side elevation in FIG. 3. With the forty-five degree outside angle between the main longitudinal axis of blade 14 and a line through a longitudinal axis of the upper connection arms of side members 30, 31, the connection of the cross-leg of the handle retaining member 40 is offset or positioned forwardly of the user 11. This offset, coupled with the length of the upper connecting arm portions 33 provides a generally rectangular opening for access of the foot to the foot pressure rest.

The length and angle of the connecting arm portions 33 of side members 30, 31, coupled with the thirty degree angle between the lower edge of blade 14 and the longitudinal axis of handle 12, along with the parallel spacing of side members 30 and 31, provide certain advantages. Initially, due to the optimum spacing-between the side members 30, 31, which corresponds to the width of the blade, the foot rest formed by bent tab portions 24 and 25 of blade 14 is readily accessible by either the left or right foot of the user 11. Secondarily, these angles permit more effective utilization of the handle 12 as a lever during soil penetration as shown in FIG. 2, and also permit more effective utilization of the trenching shovel for removal of loose soil at the bottom of the trench. For effective removal of the loose soil at the bottom of a trench, with the plane of the blade 14 generally horizontal, and with the handle at thirty degrees to this plane, the user 11 is provided with the ability to apply sufficient forward movement of the blade 14 without undue stooping or bending, thus providing a more efficient, economically fabricated trenching shovel.

FIGS. 12 and 13 depict an alternate embodiment of a blank, generally designated 50, which is formed from a generally planar sheet metal stock. The blank 50 may be used to form both sides and the blade, thereby reducing the required number of metal parts to two. For ease of description, the portions of the blank 50 which correspond to like portions of the blade 14 and sides 30, 31 will be designated by like reference numerals with a prefix "1" added thereto, that is the part that corresponds to blade 14 on blank 50 is designated 114. Similarly, the parts corresponding to side members 30, 31, are designated 130, 131 and so forth. A detailed description of these portions is not deemed necessary to a full understanding of the invention.

After forming the blank 50, the slots 137 are formed in the upper connection arms, such as arm 133, with the next step being to form the ovate depression (not shown) on each of the upper arms. Thereafter, depending on the tooling used, a first bend may be accomplished on bend line 118, with the next bends taking place along bend lines, designated 51 and 52, which correspond to the junctions of the side members 130, 131 and the opposite sides of the blade 114. Alternatively, these bends can be accomplished in one operation. Thereafter, the foot pressure rest is formed by bending tab portions 124, 125 about bend lines 120, whereupon tack welds are applied to join the heel portions 136a, 139a to the foot rest tab portions 124, 125, and a tack weld is applied at the V-groove 127. The handle retaining member 40 is then affixed as previously described.

In accordance with the present invention, there has been shown and described an embodiment of a trenching shovel, which is economically fabricated, by conventional methods, utilizing few parts, configured, dimensioned and arranged to construct an effective trenching shovel which not only facilitates soil penetration, but enables the user to readily remove loose soil at the bottom of the trench. While there has been shown and described a preferred embodiment, it is to be understood that various other adaptations and modifications may be made within the spirit and scope of the invention.

I claim:

1. A shovel, which comprises:
   (a) an elongate handle having a lower end,
   (b) a generally T-shaped handle-retaining member mounted on said lower end of said handle,
   said handle-retaining member having a generally tubular central body portion secured over said lower end of said handle in concentric coaxial relationship relative thereto, said central body portion having a lower end,
   said handle-retaining member also having a generally tubular portion connected to said lower end of said central body portion in substantially right-angle relationship to said central body portion,
   said last-named tubular portion having opposite end portions which project laterally substantially equal distances from said lower end of said central body portion, thereby forming lateral projections,
   each of said lateral projections having an outer end,
   (c) a first side member having an upper arm portion and a lower arm portion,
   said upper arm portion having an upper end, said upper end of said upper arm portion being connected fixedly to said outer end of one of said lateral projections,
   (d) a second side member having an upper arm portion and a lower arm portion,
   said upper arm portion of said second side member having an upper end,
   said upper end of said upper arm portion of said second side member being connected fixedly to said outer end of the other of said lateral projections, and
   (e) a shovel blade having generally parallel side edges that connect to said lower arm portions of said first and second side members,
   said blade having lower edge portions remote from said side members and adapted to cut into the earth,
   said blade also having an upper edge adapted to be engaged by the foot of the operator to force said lower edge portions into the earth, said first and second side members being sufficiently large that said lateral projections and said central body portion of said handle-retaining member are spaced away from said upper edge of said blade a distance sufficient that the foot of the operator may be disposed therebetween,
   said first and second side members being spaced from each other a distance sufficient that said foot of said operator may be disposed therebetween,
   whereby said operator may place his foot on said upper edge of said blade between said side members and below said handle-retaining member to press said blade into the earth.

2. The invention as claimed in claim 1, in which said handle-retaining member, said side members and said blade are formed of sheet metal.

3. The invention as claimed in claim 1, in which said upper and lower arm portions of each of said side members are at an obtuse angle relative to each other.

4. The invention as claimed in claim 1, in which said first and second side members are formed of sheet metal, and in which said lower arm portion of each of said side members is bent into two sections at generally right angles to each other, one of said sections of each of said side members being adapted to fit flatwise against the underside of one of said edges of said blade, said last-named sections being welded to said side edges of said blade.

5. The invention as claimed in claim 1, in which said upper edge of said blade has flange portions bent at generally right-angles thereto, said flange portions being adapted to have said foot of said operator applied thereto to press said blade into the earth.

6. The invention as claimed in claim 1, in which said blade is generally chevron-shaped in cross section, being a shallow trough having a central bend line, said central bend line being lower than said side edges of said blade.

* * * * *